US008908034B2

(12) United States Patent
Bordonaro

(10) Patent No.: US 8,908,034 B2
(45) Date of Patent: Dec. 9, 2014

(54) SURVEILLANCE SYSTEMS AND METHODS TO MONITOR, RECOGNIZE, TRACK OBJECTS AND UNUSUAL ACTIVITIES IN REAL TIME WITHIN USER DEFINED BOUNDARIES IN AN AREA

(76) Inventor: James Bordonaro, Bay Shore, NY (US)

( * ) Notice: Subject to any disclaimer, the term of this patent is extended or adjusted under 35 U.S.C. 154(b) by 312 days.

(21) Appl. No.: 13/289,241

(22) Filed: Nov. 4, 2011

(65) Prior Publication Data

US 2012/0188370 A1 Jul. 26, 2012

Related U.S. Application Data

(60) Provisional application No. 61/435,313, filed on Jan. 23, 2011.

(51) Int. Cl.
*H04N 7/18* (2006.01)
*G08B 13/196* (2006.01)

(52) U.S. Cl.
CPC .......... *G08B 13/19682* (2013.01)
USPC .......... 348/143

(58) Field of Classification Search
CPC .......... H04N 7/18; G08B 13/19682; G08B 13/2431; G08B 13/19693; G08B 13/2448; G08B 13/2434; G08B 21/0288; G08B 21/0227
USPC .......... 348/143, 153, 159, 169; 340/573.1, 340/573.4, 572.1, 572.2, 572.3, 572.4, 340/572.5, 572.6, 572.7, 572.8
See application file for complete search history.

(56) References Cited

U.S. PATENT DOCUMENTS

| | | | | |
|---|---|---|---|---|
| 6,581,546 | B1 * | 6/2003 | Dalland et al. | 119/712 |
| 6,985,172 | B1 * | 1/2006 | Rigney et al. | 348/149 |
| 7,259,671 | B2 * | 8/2007 | Ganley et al. | 340/539.23 |
| 7,385,513 | B2 * | 6/2008 | Everest et al. | 340/573.1 |
| 7,432,810 | B2 * | 10/2008 | Menache et al. | 340/572.1 |
| 8,170,633 | B2 * | 5/2012 | Shin et al. | 455/575.6 |
| 8,508,361 | B2 * | 8/2013 | Paolini | 340/539.15 |
| 8,552,882 | B2 * | 10/2013 | Frederick et al. | 340/686.6 |
| 8,659,414 | B1 * | 2/2014 | Schuk | 340/457 |
| 2002/0005783 | A1 * | 1/2002 | Irizarry et al. | 340/572.1 |
| 2002/0145541 | A1 * | 10/2002 | Matsui et al. | 340/934 |
| 2004/0046658 | A1 * | 3/2004 | Turner et al. | 340/539.11 |
| 2006/0293810 | A1 * | 12/2006 | Nakamoto | 701/28 |
| 2008/0036594 | A1 * | 2/2008 | Kates | 340/541 |
| 2008/0309761 | A1 * | 12/2008 | Kienzle et al. | 348/143 |
| 2009/0080715 | A1 * | 3/2009 | van Beek et al. | 348/77 |

(Continued)

FOREIGN PATENT DOCUMENTS

FR 2384450 A * 11/1978

*Primary Examiner* — Jayanti K Patel
*Assistant Examiner* — Francis G Geroleo
(74) *Attorney, Agent, or Firm* — Oakwood Law Group, LLP; Stephen Liu

(57) ABSTRACT

A surveillance system and method that utilize computer vision technology and background subtraction to monitor, recognize, and track objects or unusual activities within user specified boundaries. The system and method comprises at least one camera and at least one computer with a software program showing one or multiple windows of camera's field of views in real time. The program allows users to define one or multiple boundaries within any window. The program further utilizes background subtraction technique to establish normal "home-position" of objects within defined boundaries. The program compares current image of the objects against the normal "home-position" to determine/calculate the difference of pixel intensity values. If the difference is beyond the predetermine threshold, the program will flag the movement of the object and give off alert.

18 Claims, 5 Drawing Sheets

(56) References Cited

U.S. PATENT DOCUMENTS

2010/0002082 A1* 1/2010 Buehler et al. ................ 348/159
2010/0111377 A1* 5/2010 Monroe ........................ 348/143
2010/0259537 A1* 10/2010 Ben-Himane et al. ........ 345/419
2011/0181716 A1* 7/2011 McLeod et al. ............... 348/143

* cited by examiner

SURVEILLANCE SYSTEMS AND METHODS TO MONITOR, RECOGNIZE, TRACK OBJECTS AND UNUSUAL ACTIVITIES IN REAL TIME WITHIN USER DEFINED BOUNDARIES IN AN AREA

REFERENCE TO RELATED APPLICATIONS

This patent application claims the benefit of U.S. Provisional Application No. 61435313 filed on Jan. 23, 2011, the disclosure of which is incorporated herein by reference in its entirety.

BACKGROUND OF THE INVENTION

1. Field of the Invention

The present invention generally relates to surveillance systems and methods, and more particularly to surveillance systems and methods that utilize background subtraction and computer vision technology to monitor, recognize, and track objects and unusual activities in real time for residential, commercial offices and warehouse.

2. Description of Related Art

A programmable boundary pet containment system for providing invisible fence to control the access of animals to areas outside of programmed boundaries is known in prior art. More specifically, by way of example, U.S. Pat. No. 6,043,748 to Touchton et al. discloses a programmable boundary pet containment system that comprises a programmable relay collar which is provided on an animal to transmit positional data as detected from positional satellites to a remotely located processing station. The processing station calculates the relayed data to determine the position of the animal relative to a configuration data file establishing confinement area boundaries. Similar inventions are disclosed in U.S. Pat. Nos. 6,271,757; 6,700,492; and 6,903,682.

Security systems that monitor living or nonliving, moving or standing objects other than pets are also known in prior art. They may utilize different technologies involving sensors or video cameras.

U.S. Pat. No. 7,068,166 to Shibata et al. discloses a break-in detection system including a detection sensor of an FBG type fiber optics for detecting an intruder to climb over a fence around a premises, and a detection sensor of an OTDR type for detecting an intruder trying to demolish the fence.

U.S. Pat. No. 7,084,761 to Izumei et al. discloses a device including a security system which emits a radio wave from a building to a predetermined area outside the building to detect an object and on the basis of output of the object detecting unit, a judgment is made as to whether or not the object will intrude into the predetermined area.

Systems designed to monitor predetermined area, places or objects using video cameras that provide a continuous feed of video data that is either displayed in real time on a display device and/or recorded to a recording device are known in the art and in marketplace. While these systems provide for capture and recordation of video data depicting the conditions and/or occurrences within the monitored area, they do not provide a means of easily determining when and where an occurrence or condition has taken place. Nor do they provide for any means of analyzing the information depicted by the video data. Therefore, U.S. Pat. No. 7,106,333 to Milinusic (2006) discloses a system for collecting surveillance data from one or more sensor units and incorporating the surveillance data into a surveillance database. The sensor unit is configured to monitor a predetermined area, and is further configured to detect any changes in the area and capture an image of the changes within the area.

In the past, computational speed and technique has limited the real-time monitoring, processing and analysis applications of video camera surveillance data. As a consequence, most of the video camera surveillance data are watched, monitored or analyzed by local or remote security guards. There could be human bias or neglect when the surveillance video data are monitored and analyzed by human. Thus, there exists a need to have surveillance systems and methods that monitor, recognize, and track objects and unusual activities by computer software programs. Based on advanced computational technique and software, as well as sophisticated hardware that are currently available in the field, the present invention provides systems and methods that can monitor, recognize, and track the objects, and determine when and where an occurrence or condition has taken place without using additional sensor units.

SUMMARY OF THE INVENTION

One object of the present invention is to help define a singular or multiple boundaries within the actual property boundaries (perimeters).

Another object of the present invention is to monitor children, elderly and/or sick and/or handicapped people, and pets, and set up shock and/or voice warning that is implemented on pets.

Another object of the present invention is to detect any moving objects that were previously still and to detect any still objects that were previously in motion.

Another object of the present invention is to monitor, flag, check alien objects entering into predefined boundaries.

Yet another object of the present invention is to count traffic of people and vehicles in different settings.

A further object of the present invention is to incorporate facial recognition and possibly associating with voice recognition.

The present invention is directed towards surveillance systems and methods utilizing computer vision technology and background subtraction technique for monitoring, recognizing, tracking objects and/or unusual activities within user specified boundaries defined inside properties boundaries (perimeters) of residential and/or commercial premises. The surveillance systems and methods according to the present invention can monitor, track, and confine pets within fenceless property boundary.

In one aspect, system described herein will provide hardware and programs that support one and/or multiple cameras, each monitoring a different area of actual external property and/or internal building floor layout for residential homes and commercial buildings (offices and warehouses in general). The image captured by each camera's field of view can be displayed as separate windows in the program on a displaying device(s). The system's software will be able to utilize existing cameras already in use.

The program further allows users to define one or multiple specific boundaries by drawing any shape within each window of each camera's field of view while viewing actual external property and/or internal building floor layout in real time.

The system comprises a method that utilizes the background subtraction technique known in the art to establish each monitored object's normal "home position" within the field of view and to monitor the unusual activities. An object's normal "home position" within the field of view of the camera is determined/calculated as the stability of the time-average pixel values. The current image of the object is compared with the normal "home position" for differences in pixel intensity values. If the pixel intensity value changes of the object are beyond the predetermined thresholds, the object is considered "moved" and the particular movement of the object will be flagged by the program.

This method also applies to monitoring intruders. The system will determine what type of object is approaching the property boundary or climbing the fence/wall based on identification characteristics. If the object is determined to be a human, the face detection system will process and will flag or send warning voice if the person is not authorized.

One aspect of the invention relates to a system for identifying family members and office employees to allow or deny their entry into specifically defined areas. This method would utilize local and/or wide area network system with facial scanning capability to establish in house/in office/in building/in firm personnel face database. Employees will no longer need to worry about bringing their ID card or bother with searching and taking out their ID card to swipe at the machines in front of security gate/door.

This system may further be used for counting traffic of people and/or vehicles in different settings. The system's software are able to distinguish large vehicles (trucks) from smaller ones.

The system may incorporate color identification capabilities in addition to size recognition to distinguish between pet or human and person X from person Y. In one aspect, system described herein will further comprise at least one mobile unit that can be worn by monitored objects including children, elderly and/or sick and/or handicapped people, and/or pets. Such mobile units may be color coded wristbands or T-shirts for people and color coded collars for pets for identification purpose. The system may further comprise at least one reflective marker installed on the ground along the perimeter of a property. The mobile units may include photonic elements which can recognize the reflective markers on the ground and calculate the distance from the defined boundaries. If the distances are determined to be too close to the boundary, then a flag for warning or warning voice would be sent to the monitored objects. The collars worn by the pets may include a radio receiver for giving off warning or shock to pets. The system may further comprise an IR camera that can recognize the reflective marker installed on the ground.

Current non-physical fences in the marketplace require buried wires and works by electronic stimulation when receiver module worn by the monitored objects is brought close enough for electronic flagging. The perimeter being setup this way has configuration confinements. The user can not readily change the boundaries of the authorized area. Since the present systems and methods can cover the scope of pets monitoring and work as a fenceless property boundary it may replace the current technology of existing fenceless property boundary. The systems and methods of the present invention address the problems of these current non-physical fences and create a user friendly electronic and computerized controlled property perimeter with potential up & downlink to and from current GPS technology (possibly DGPS).

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

The present invention is directed towards surveillance systems and methods utilizing computer vision technology and background subtraction technique for monitoring, recognizing, tracking objects or unusual activities within user specified boundaries defined inside the properties' perimeters of residential and/or commercial premises.

Figure 1:
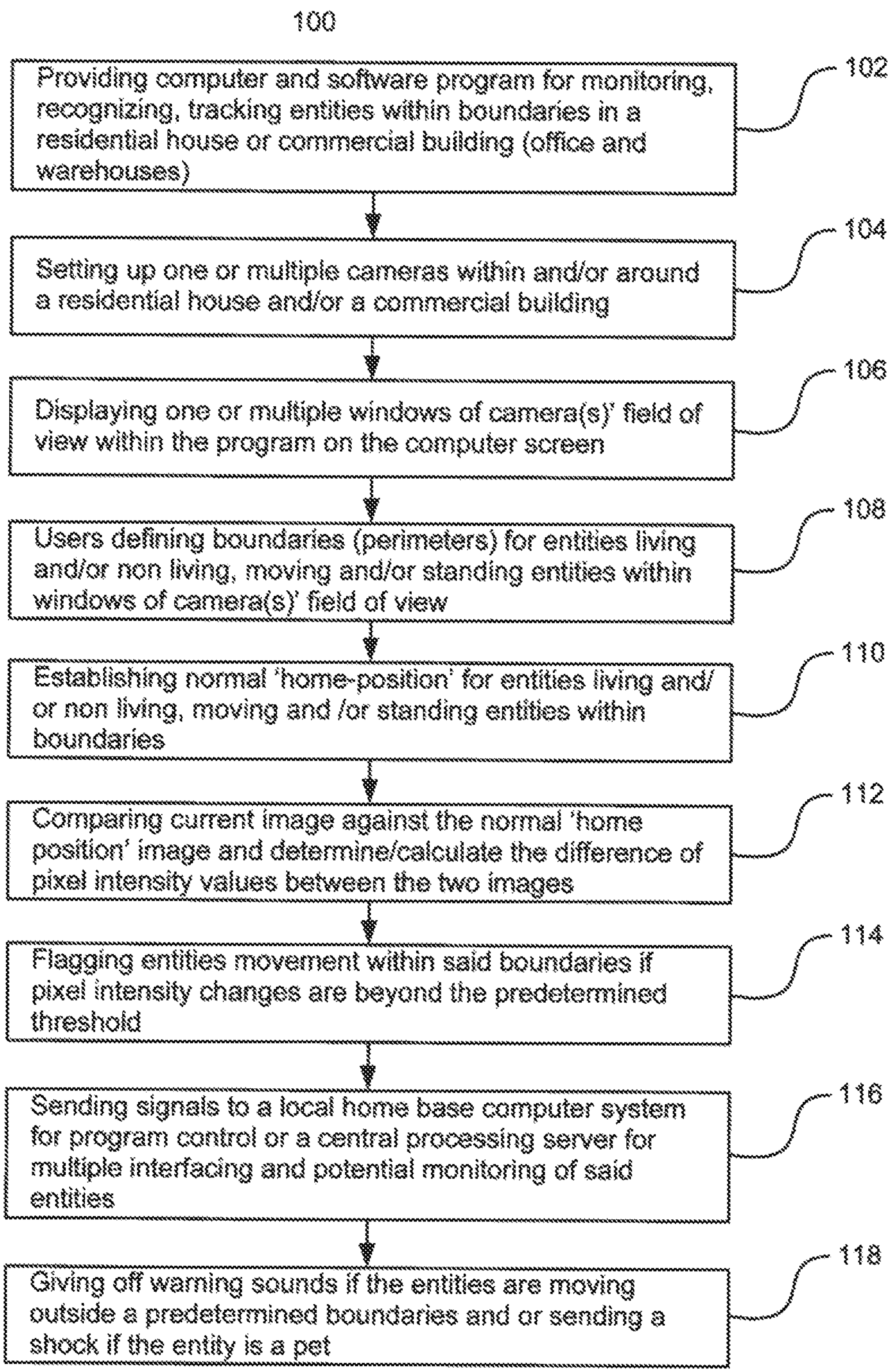
FIG. 1 is a flowchart of a system/method for monitoring, recognizing, tracking objects within user defined boundaries in residential and/or commercial premises according to the present invention.

Referring to FIG. 1, there is disclosed a flowchart 100 of a method/system for monitoring, recognizing, tracking objects within boundaries in residential (homes) and/or commercial premises (offices and/or warehouses).

The system/method provide hardware and programs 102 that support one and/or multiple cameras 104, each monitoring a different area of actual external property and/or internal building floor layout for residential homes and commercial buildings (offices and warehouses in general). The image captured by each camera's field of view can be displayed as separate windows within the program on the displaying devices (e.g. computer screens) 106. In one embodiment, the system allows for up to eight video cameras to be set up/wired. Different (fixed) focal length cameras can be utilized along with varying focal length units. The system may further include IR camera if necessary for better night visions.

The program further allows users to define one or multiple specific boundaries within each window of each camera's field of view while viewing actual external property and/or internal building floor layout in real time 108. Similar to Zoom & Define Window Command in most upper end computer aided design (CAD) Programs, users may be able to click on a drawing tool icon to select a drawing tool that they can use to define the boundaries by drawing them on the image. Said boundaries may be drawn in any shapes, such as round, square, polygon, point to point straight line, using mouse and/or pointer. The program further allows for one or multiple boundaries to be drawn within one and/or multiple camera's field of view. The program also allows users to define specific boundaries for particular and separate objects. For example, specific multiple boundaries may be set up (drawn) in pool areas for monitoring unauthorized objects and monitoring authorized children who come too close to the pool area for safety concerns.

The system and program of the present invention can register, monitor, and track people, animals and inanimate objects, such as—expensive items, items with sentimental value and will be alerted if inanimate objects should move, preventing theft. The system can recognize possible and potential bad situations, such as distinguishing unusual activities and circumstances by flagging objects moving in and out of defined boundaries. The system's program utilizes the background subtraction technique known in the art to establish each monitored objects' normal "home position" within the field of view and monitor the unusual activities 110.

Background subtraction is the most common technique known in the art for moving object extraction. The idea is to subtract a current image from a static image representing the 'background in a scene. Background subtraction is performed typically during a pre-processing step to object recognition and tracking. Most prior art background subtraction methods are based on determining a difference in pixel intensity values (pixel image differentiation) between two images.

An object's normal "home position" within the field of view of the camera is determined/calculated as the stability of the time-average pixel values. The current image is compared with the normal "home position" for difference in pixel intensity values 112. If the differences of the pixels are within the set up threshold indicating that the monitored object stay the same without movement. Any object having pixel change beyond the threshold is considered "moved" and the particular movement of the object will be flagged by the program 114. The background image is updated constantly. The program sends signals to a local home base computer system for program control or a central processing server for multiple interfacing and potential monitoring of said objects 116. The program will give off warning sound. The warning alarm for the end users/customers can be set to be a beeping or voice. It can further be a call to the mobile phone 118. If defined perimeters and/or programmed circumstance are breached or noticed to be different, then program would flag this occurrence. It will be basically open architectural programming to allow end user input for their specific needs.

For example, if a normally motionless object should develop motion (in any direction,) the program will flag that particular movement of the object and process information appropriately as programmed. This includes detection of electric light fixtures being turned on and off, detection of smoke, detection of running water, detection in disturbance of calm water, detection of any moving objects that were previously still, and detection of stilled objects that were previously in motion.

Figure 2:
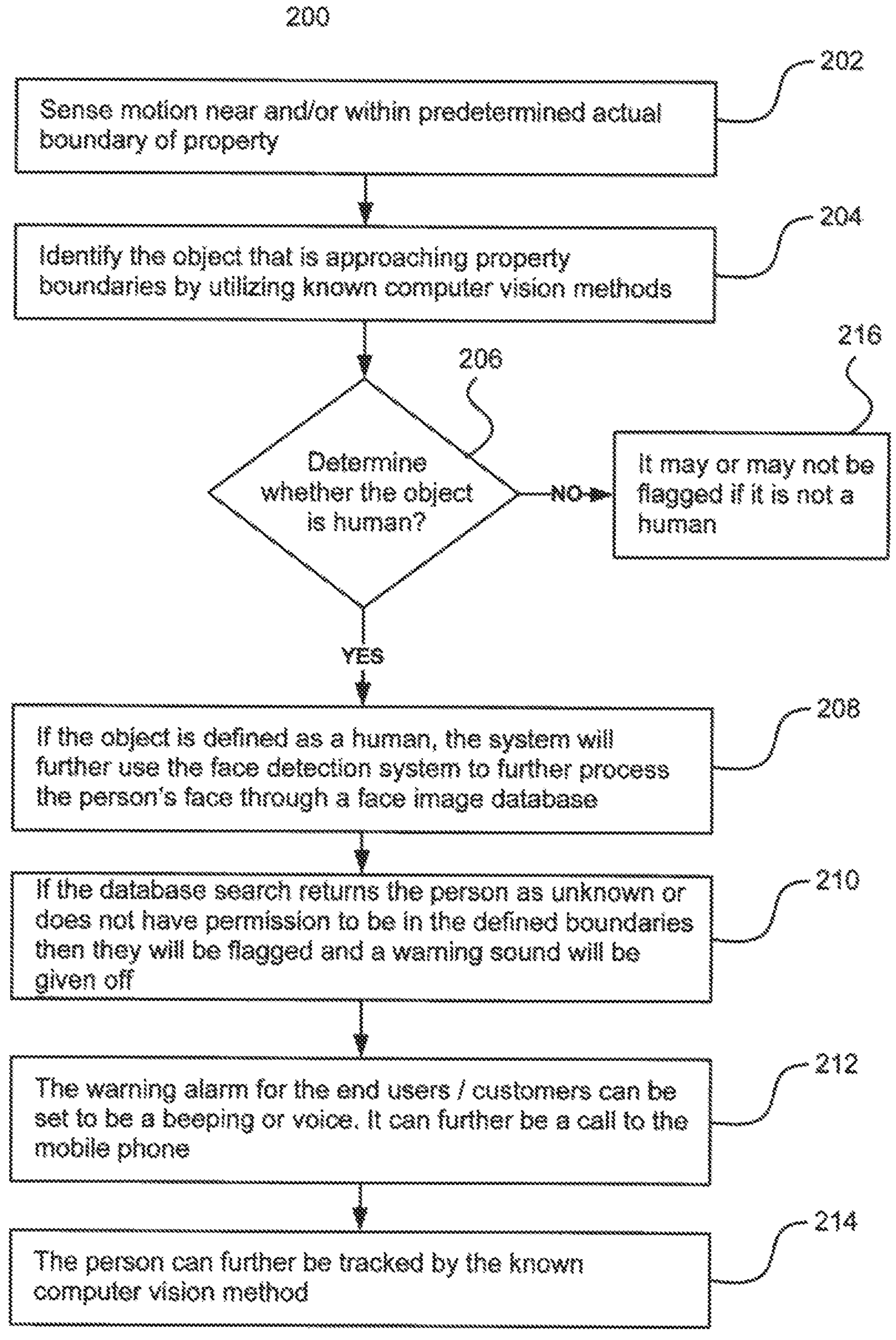
FIG. 2 is a flowchart of a system/method for monitoring, recognizing, tracking intruders crossing the actual property boundary (perimeters) of residential and/or commercial premises according to the present invention.

This system/method also applies to monitoring intruders. Referring to FIG. 2, there is disclosed a flowchart 200 of a method/system for monitoring, recognizing, tracking intruders approaching/crossing the actual property boundary (perimeters) of residential and/or commercial premises. First the system will recognize motion in the field of view of the camera 202. The system will identify the object that is approaching property perimeters by utilizing known computer vision methods 204 such as feature point detection and/or template-based tracking. There are already many computer vision methods available that are working on 2D structures and perform a feature matching, such as the "scale-invariant feature transform" (SIFT) detector and descriptor or the "speeded up robust features" (SURF) method. Certain other descriptors based on classification were also published, like randomized trees, randomized ferns, and a boosting method.

The surveillance system of the present invention may alternatively utilize computer vision CAD models known in the art. The computer vision CAD models will automatically be trained in selecting the best set of features and computer vision method to use for object recognition. Because CAD models are 3D representation of an object that can be manipulated to different poses, the 3D CAD model may be rotated to different perspective views to match and identify objects in different angles such as front facing or sideways.

After the system identifies an object as human 206, the system will further use the face detection system to further process the person's face through a face image database 208. If the database search returns the person as unknown or does not have permission to be in the defined boundaries then they will be flagged and a warning sound will be given off 210. The warning alarm for the end users/customers can be set to be a beeping or voice. It can further be a call to the mobile phone 212.

This can be programmed via executable program for many options. The person can further be tracked by the known computer vision methods and the background subtraction concept 214 described above. Other type of objects can also be defined and identified based on set features. User can select objects to ignore. If a deer is selected to be ignored and it entering or reaching perimeter of a back yard that is being monitored may or may not be flagged 216.

The system may incorporate color identification capabilities in addition to size recognition to further distinguish between pet or human and person X from person Y.

The Face Detection Technology mentioned in the previous paragraph in step 208 may automatically zoom and highlight (focus on) a person's face. The system may further include Face Detection Technology that automatically zoom and highlight (focus on) a person's face. The face may be stored in a database and the information may be retrieved to identify the person when they enter the area to be monitored. The system may further associate a person's voice with images of their face each time they enter into the monitored area.

Figure 3:
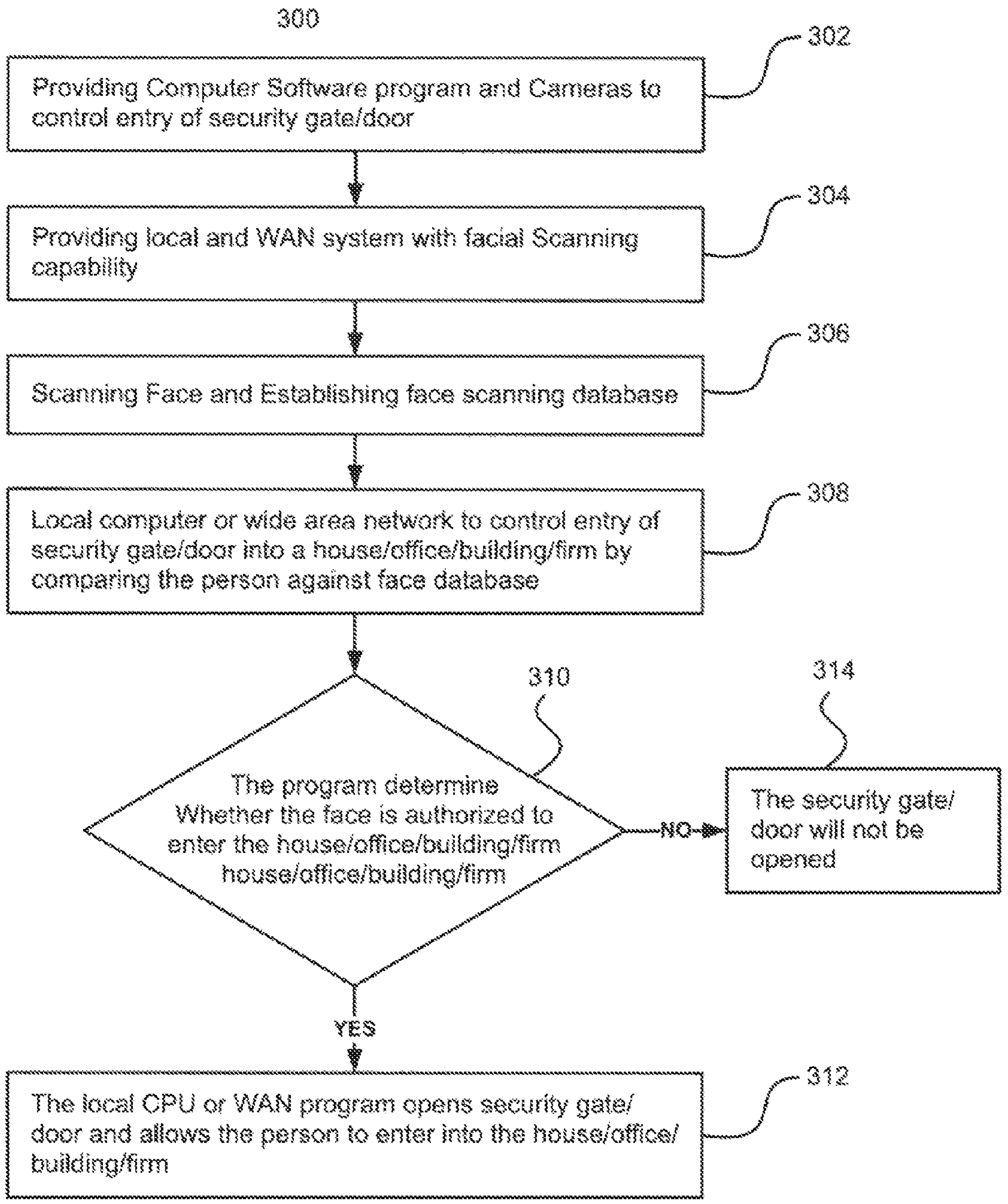
FIG. 3 is a flowchart of a system/method utilizing local and/or wide area network system with facial scanning capability to establish in house/in office/in building/in firm personnel facial scanning database to control personnel's entry into a house/office/building/firm through the security gate/door according to the present invention.

FIG. 3 illustrates a method/system for identifying family member and office employees to move freely about their specifically defined areas. This method 300 would utilize camera 302, local and/or wide area network system with facial scanning capability 304 to establish in house/in office/in building/in firm personnel facial scanning database 306. Although local and wide area network system with facial scanning capability would increase manufacturing cost, this would revolutionize the current office security system. Everything will be automated. Employees will no longer need to worry about bringing their ID card or bother with searching and taking out their ID card to swipe at the machines in order to enter the security door and/or gate of the house/buildings. Prior to entering the house/office/building/firm in front of security gate/door, the image of the person captured by the surveillance camera will be compared to the face database to determine whether the person is authorized to enter into the house/office/building/firm 308. If the family member or employee is authorized to enter the house or the building 310, the system (program) can recognize the face and open the security door/gate to allow their entry 312.

Figure 4:
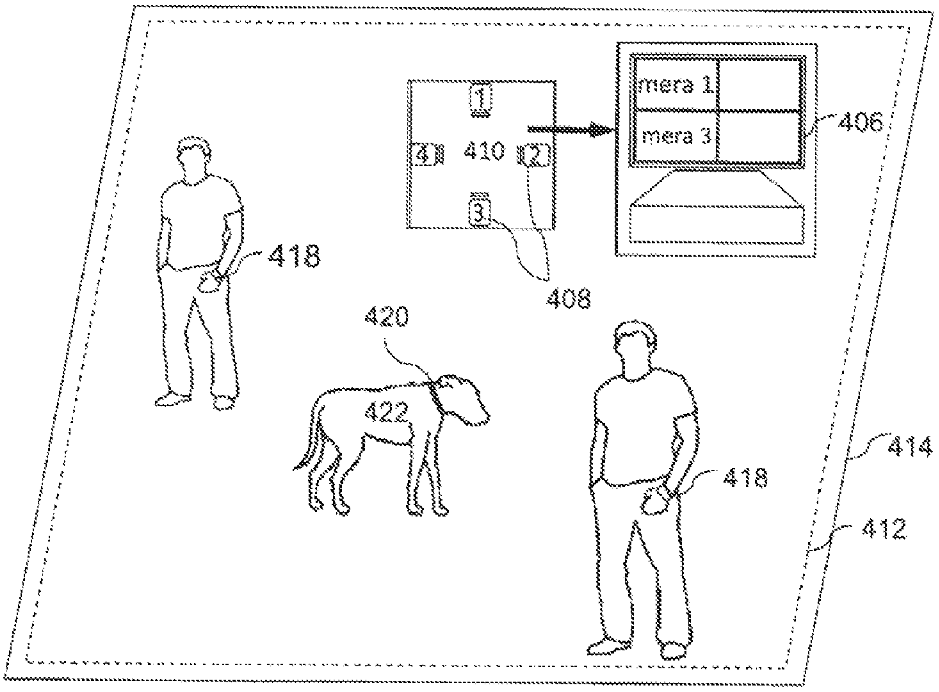
FIG. 4 illustrates a system for monitoring, recognizing, and tracking children, elderly and/or sick and/or handicapped people, and/or pets within the user defined boundaries and/or the fenceless property (yard).

Referring to FIG. 4 there are disclosed main components of the system for monitoring, recognizing, and tracking children, elderly and/or sick and/or handicapped people, and/or pets within the fenceless property (yard). The system 400 comprises:

(1) A central processing unit in a computer 402 including program/software 406 installed on the computer, which display multiple windows of video cameras' field of view from individual cameras in real time.

(2) One or more cameras 408, utilized at each side of a house 410 or building. Each camera 408 can recognize maximum 50 meters in general at low cost base. If larger distance is required, more expensive cameras and configuration can be employed. The system may further comprise an IR camera that can recognize the reflective marker installed on the ground.

(3) A plurality of reflective markers 412 placed through various means on the ground along the perimeters 414. The reflective markers are one of mirrors, prefabricated plastic border liners, fluorescent coatings, other reflective optical devices, and any combination thereof. The reflective markers are applied to along the ground, grass, pavement perimeter borders at 1.0-1.20 meters intervals, fluorescent coatings can be then utilized in non sun light/lighted areas.

(4) One or more mobile units 416 in a form of wrist bands 418 for people and collars 420 for pets may be color coded. The subjects may be recognized by colors of the mobile units 416. The mobile units 416 may further include photonic elements to recognize lines or marks 412 along perimeter 414 and calculate the distance. If distances are determined to be too close to the boundaries, predefined or randomly adjusted within program, then a flag for warning would be transmitted to recipient and/or overseer. The pet's collar 420 may have radio signal receiver. So, the program can send pets 422 a radio signal then initiate a warning shock if necessary. The mobile units may transmit data to central server (Local CPU) 402.

Figure 5:
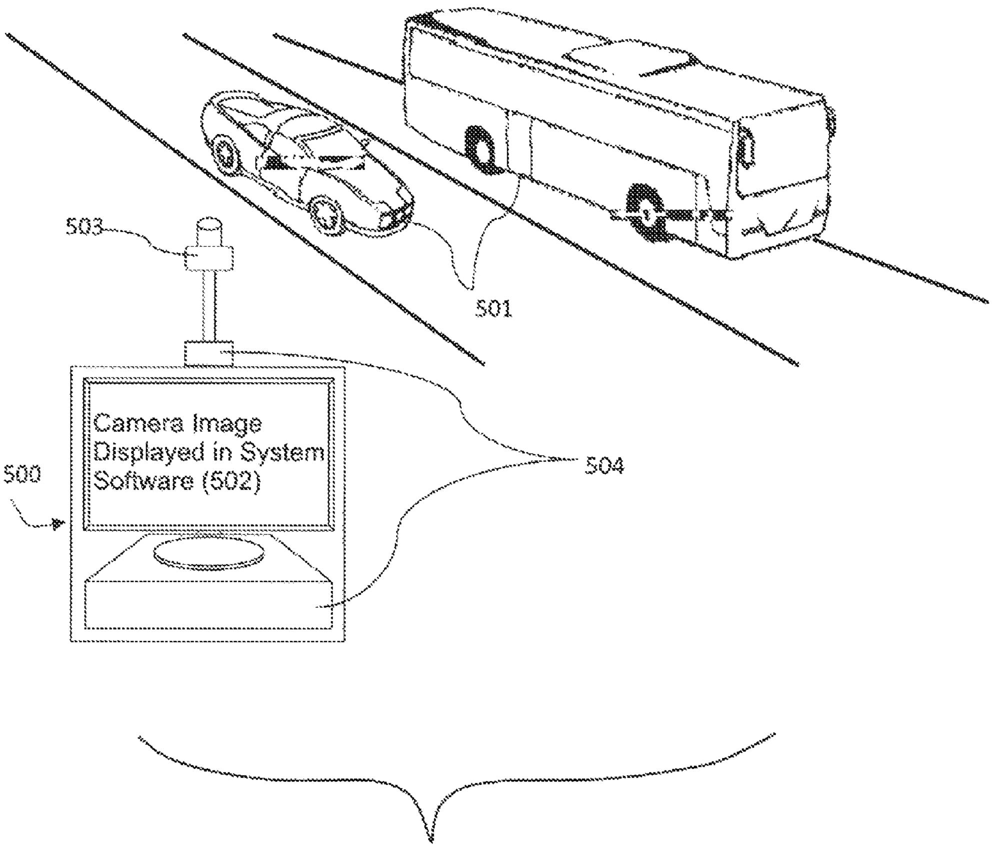
FIG. 5 illustrates a system for monitoring, recognizing, counting traffic of people and vehicles in different settings.

FIG. 5 illustrates that the system 500 may further be used for counting traffic. It may have different settings for counting people, vehicles 501 or both. The system's software 502 should be able to characterize large vehicles 501 (trucks) from smaller ones. The system's software 502 will be able to utilize existing cameras 503 already in use. The system may provide additional hardware 504 (motherboard inputs, connectors) to connect and act as a gateway to work together with existing cameras 503 to process their video information accordingly.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A system for monitoring, recognizing, and tracking objects comprising:

a. at least one cameras installed within and/or around a house and/or a commercial building;

b. a central server including at least one local CPU comprising a computer and a program/software installed on the computer, which show one or multiple windows of camera(s)' field of views in real time on a display device (e.g. computer screen), each field of view from an individual camera, the central server receives data transmitted from the cameras, the program allows users to define one or multiple boundaries within one and/or multiple windows of camera(s) field of view;

c. at least one reflective marker installed on the ground along the perimeter of a property or a border; and d. at least one color coded mobile unit that are worn by objects for identification purpose, the color coded mobile units worn by objects further including photonic elements that can recognize the reflective markers along the boundaries (perimeters) of a property and calculate the distance.

2. The system for monitoring, recognizing, and tracking objects of claim 1 wherein the recipients are objects includes non-living and living which is one of children, elderly and/or sick, and/or handicapped people, and pets; and wherein the mobile units are colored collars for pets which may include a radio signal receiver and/or colored wrist bands and/or T-shirts for children and/or elderly and/or sick, and/or handicapped people.

3. The system for monitoring, recognizing, and tracking objects of claim 1 wherein the program including a size parameter and color parameter of the monitored objects for recognition.

4. The system for monitoring, recognizing, and tracking objects of claim 3, wherein the cameras and the program utilize face detection technology to automatically zoom in and highlight a person's face after the monitored object is determined to be human.

5. The system for monitoring, recognizing, and tracking objects of claim 1, wherein the cameras may be fixed focal length cameras, varying focal length camera, and/or IR camera, and/or the combination thereof.

6. The system for monitoring, recognizing, and tracking objects of claim 1 further comprising a local and/or wide area network system with facial scanning capability to store and establish personnel face database of in house/in office/in building/in firm.

7. The system for monitoring, recognizing, and tracking objects of claim 1, wherein the program allows for manually drawing specific single or multiple boundaries within the window of the camera's field of view on the screen within program set itself while viewing actual external property boundary or internal building floor layout in real time to define specific window boundaries; the boundaries (perimeters) are drawn by using a mouse and/or digitizing pointer; the program allows for viewing a defined single and/or multiple boundaries within any window of camera's field of view.

8. The system for monitoring, recognizing, and tracking objects of claim 1 wherein the program further establishing normal 'home-position' for each of the objects to be monitored within boundaries and comparing current image with the normal 'home-position' of the objects to determine whether the objects have been moved or not based on pixel intensity difference.

9. The system for monitoring, recognizing, and tracking objects of claim 1 further comprising voice recognition components.

10. The system for monitoring, recognizing, and tracking objects of claim 1 further comprising hardware (motherboard inputs, connectors) to connect and act as a gateway to work together with existing cameras to process their video information accordingly.

11. A method for monitoring, recognizing, and tracking objects comprising steps of:

a. setting up a local home base computer system and/or a central processing server where at least one computer and software program for monitoring, recognizing, and tracking objects are installed;

b. installing at least one reflective marker installed on the ground along a perimeter of a property or a border and providing color coded mobile units which has photonic elements for the objects to wear;

that recognizes the at least one reflective marker installed on the ground along the perimeter and calculates distances c. setting up one or multiple cameras within and/or around a residential house and/or a commercial building;

d. users defining boundaries for objects living and/or non living, moving and/or standing objects within windows of camera(s)' field of view;

e. establishing normal 'home-position' for the objects living and/or non living, moving and/or standing objects within the boundaries;

f. setting up thresholds for pixel intensity changes;

g. comparing current image against the normal 'home position' and determine/calculate difference of pixel intensity values between the two;

h. flagging objects movement within the boundaries if pixel intensity changes are beyond the predetermined threshold; and i. sending signals to a local home base computer system for program control or a central processing server for multiple interfacing and potential monitoring of the objects.

12. The method for monitoring, recognizing, and tracking objects of claim 11 wherein the users can define a single or multiple boundaries in any shape within any window by using a mouse and/or digitizing pointer.

13. The method for monitoring, recognizing, and tracking objects of claim 11 further comprising a step of giving off warning sounds if the objects are moving outside a predetermined boundaries and/or sending a shock if the object is a pet.

14. The method for monitoring, recognizing, and tracking objects of claim 11 further comprising a step of scanning face of family members or company employees to establish personnel face recognition database so that the family members or company employees may walk freely within specified defined area without need of carrying ID badges.

15. The method for monitoring, recognizing, and tracking objects of claim 11 further comprising a step of counting traffic of people and vehicles in different settings, and distinguish large vehicles from small ones.

16. The method for monitoring, recognizing, and tracking objects of claim 11 further comprising a step of identifying an object that is approaching boundary by utilizing known computer vision methods, such as feature point detection and/or template-based tracking.

17. The method for monitoring, recognizing, and tracking objects of claim 11 further comprising a step of recognizing objects utilizing computer vision CAD model.

18. A system for monitoring, recognizing, and tracking objects comprising:

(a) a software installed on the computer, which show multiple videos from individual cameras in real time;

(b) at least one cameras, utilized at each side of a house or building, each camera can recognize maximum 50 meters in general and at low cost base;

(c) at least one reflective marker placed (through various means on the ground along the perimeter;

(d) at least one mobile Unit utilized to help transmit data to the central server (local CPU) including photonic elements incorporated on the mobile unit that recognizes the reflective markers along perimeter and calculates the distances; if distances are determined to be within specification, then a flag for warning and possible voice warning would be transmitted to the recipients; a warning shock can be implemented on the pets if necessary; an alert can be sent to the users.

* * * * *